(12) United States Patent
Lee (10) Patent No.: US 10,165,303 B2
(45) Date of Patent: Dec. 25, 2018

(54) CONTENT STREAMING SYSTEM AND METHOD

(71) Applicant: Flux Planet, Inc., Seoul (KR)

(72) Inventor: Sang Yup Lee, Seoul (KR)

(73) Assignee: Flux Planet, Inc., Seoul (KR)

( * ) Notice: Subject to any disclaimer, the term of this patent is extended or adjusted under 35 U.S.C. 154(b) by 107 days.

(21) Appl. No.: 15/336,276

(22) Filed: Oct. 27, 2016

(65) Prior Publication Data

US 2018/0115785 A1 Apr. 26, 2018

(30) Foreign Application Priority Data

Oct. 21, 2016 (KR) .......................... 10-2016-0137704

(51) Int. Cl.
| | |
|---|---|
| *H04N 19/58* | (2014.01) |
| *H04N 19/54* | (2014.01) |
| *H04L 29/06* | (2006.01) |
| *H04N 19/587* | (2014.01) |
| *H04N 19/146* | (2014.01) |
| *H04N 19/172* | (2014.01) |

(52) U.S. Cl.
CPC ....... *H04N 19/587* (2014.11); *H04L 65/4069* (2013.01); *H04L 65/602* (2013.01); *H04L 65/607* (2013.01); *H04N 19/146* (2014.11); *H04N 19/172* (2014.11); *H04N 19/54* (2014.11)

(58) Field of Classification Search
CPC .... H04N 19/587; H04N 19/54; H04L 65/602; H04L 65/607
USPC .................................................. 375/240.12
See application file for complete search history.

(56) References Cited

U.S. PATENT DOCUMENTS

| | | |
|---|---|---|
| 6,047,088 A | 4/2000 | van Beek et al. |
| 8,514,933 B2 | 8/2013 | Lang et al. |
| 2016/0065993 A1 | 3/2016 | Tanizawa et al. |

FOREIGN PATENT DOCUMENTS

| | | |
|---|---|---|
| JP | 2001-506828 A | 5/2001 |
| JP | 2016-046778 A | 4/2016 |
| KR | 10-2007-0114792 A | 12/2007 |
| WO | 2014/052437 A1 | 4/2014 |

*Primary Examiner* — Jeffery A Williams
(74) *Attorney, Agent, or Firm* — Novick, Kim & Lee, PLLC; Jae Youn Kim (57) ABSTRACT

A content streaming system includes: an encoding unit generating frame-by-frame mesh data and motion data, converting the mesh data into a geometry image, encoding the geometry image with tagged motion data, and generating first streaming data; a traffic control unit selecting a drop frame dropping the geometry image based on a network bandwidth, dropping the geometry image of the drop frame from the first streaming data, and generating second streaming data; and a decoding unit decoding the second streaming data, converting a geometry image of the decoded second streaming data into mesh data, and interpolating and generating mesh data of the drop frame.

16 Claims, 6 Drawing Sheets

CONTENT STREAMING SYSTEM AND METHOD

CROSS-REFERENCE TO RELATED APPLICATION

This application claims the benefit of priority of Korean Patent Application No. 10-2016-0137704, filed on Oct. 21, 2016, in the Korean Intellectual Property Office, the disclosure of which is incorporated herein in its entirety by reference.

BACKGROUND

1. Field

One or more embodiments relate to content streaming systems and methods, and more particularly, to four-dimensional (4D) content streaming systems and methods that may control traffic by taking into account the bandwidth of a communication network and recover data dropped in a traffic control process by using motion data-based interpolation.

2. Description of the Related Art

Recently, as augmented reality and virtual reality markets are in the spotlight, related technologies are being researched. However, while hardware technologies for implementing augmented reality and virtual reality develop rapidly, the biggest constraint on market activation is failing to abundantly provide related content. In particular, real person-centered content is produced very restrictively due to the difficulty in the production method thereof. Also, since the produced content is much larger in data size than conventional video data, the actual use thereof is very difficult in the current situation.

SUMMARY

One or more embodiments include four-dimensional (4D) content streaming methods that may control traffic by taking into account the bandwidth of a communication network and recover data dropped in a traffic control process by using motion data-based interpolation.

One or more embodiments include streaming 4D content capable of expressing three-dimensional (3D) motion of a real person by using a conventional video-based infrastructure.

One or more embodiments include increasing the accuracy of stream data in a 4D data streaming process by using motion data-based interpolation.

Additional aspects will be set forth in part in the description which follows and, in part, will be apparent from the description, or may be learned by practice of the presented embodiments.

According to one or more embodiments, a content streaming system includes: an encoding unit generating frame-by-frame mesh data and motion data, converting the mesh data into a geometry image, encoding the geometry image with tagged motion data, and generating first streaming data; a traffic control unit selecting a drop frame dropping the geometry image based on a network bandwidth, dropping the geometry image of the drop frame from the first streaming data, and generating second streaming data; and a decoding unit decoding the second streaming data, converting a geometry image of the decoded second streaming data into mesh data, and interpolating and generating mesh data of the drop frame.

The motion data tagged to the dropped geometry image may not be dropped from the drop frame.

The decoding unit may interpolate and generate the mesh data of the drop frame based on motion data of the drop frame and mesh data of a frame adjacent to the drop frame.

The drop frame may be selected but not a keyframe corresponding to big-motion motion data among the motion data.

The drop frame may be a frame adjacent to the keyframe.

The encoding unit may include: a mesh data acquiring unit acquiring the frame-by-frame mesh data; a motion data acquiring unit acquiring the motion data corresponding to the frame-by-frame mesh data; a keyframe setting unit setting a frame corresponding to big-motion motion data among the motion data as a keyframe; a geometry image conversion unit converting the mesh data into the geometry image; a motion data tagging unit tagging the motion data to the geometry image; and an encoder encoding the geometry image with tagged motion data and generating the first streaming data.

The decoding unit may include: a decoder decoding the second streaming data; a geometry image extracting unit extracting a geometry image from the decoded data; a mesh data conversion unit converting the extracted geometry image into mesh data; and a mesh data interpolation unit interpolating and generating mesh data corresponding to the drop frame based on motion data of the drop frame and mesh data of a frame adjacent to the drop frame.

The mesh data interpolation unit may interpolate and generate the mesh data of the drop frame by a blend shape technique by using the motion data corresponding to the mesh data of the adjacent frame.

According to one or more embodiments, a content streaming method includes: an encoding operation of generating frame-by-frame mesh data and motion data, converting the mesh data into a geometry image, encoding the geometry image with tagged motion data, and generating first streaming data; a traffic control operation of selecting a drop frame dropping the geometry image based on a network bandwidth, dropping the geometry image of the drop frame from the first streaming data, and generating second streaming data; and a decoding operation of decoding the second streaming data, converting a geometry image of the decoded second streaming data into mesh data, and interpolating and generating mesh data of the drop frame.

The motion data tagged to the dropped geometry image may not be dropped from the drop frame.

The decoding operation may include interpolating and generating the mesh data of the drop frame based on motion data of the drop frame and mesh data of a frame adjacent to the drop frame.

The drop frame may be selected but not a keyframe corresponding to big-motion motion data among the motion data.

The drop frame may be a frame adjacent to the keyframe.

The encoding operation may include: a mesh data acquiring operation of acquiring the frame-by-frame mesh data; a motion data acquiring operation of acquiring the motion data corresponding to the frame-by-frame mesh data; a keyframe setting operation of setting a frame corresponding to big-motion motion data among the motion data as a keyframe; a geometry image conversion operation of converting the mesh data into the geometry image; and a motion data tagging operation of tagging the motion data to the geometry image.

The decoding operation may include: a geometry image extracting operation of extracting a geometry image from the decoded second streaming data; a mesh data conversion operation of converting the extracted geometry image into mesh data; and a mesh data interpolation operation of interpolating and generating mesh data corresponding to the drop frame based on motion data of the drop frame and mesh data of a frame adjacent to the drop frame.

The mesh data interpolation operation may include interpolating and generating the mesh data of the drop frame by a blend shape technique by using the motion data corresponding to the mesh data of the adjacent frame.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

The following detailed description of the inventive concept refers to the accompanying drawings that illustrate embodiments of the inventive concept. The embodiments are described in sufficient detail to enable those of ordinary skill in the art to implement the inventive concept. It will be understood that various embodiments of the inventive concept are not necessarily mutually exclusive while being different from each other. For example, particular shapes, structures, and features described herein may be modified from some embodiments to other embodiments without departing from the spirit and scope of the inventive concept. Also, it will be understood that the position or arrangement of individual components in the respective embodiments may be modified without departing from the spirit and scope of the inventive concept. Thus, the following detailed description should be considered in a descriptive sense only and not for purposes of limitation, and the scope of the inventive concept should be construed as including the appended claims and the equivalents thereof. In the drawings, like reference numerals will denote like elements throughout various aspects.

Hereinafter, various embodiments of the inventive concept will be described in detail with reference to the accompanying drawings so that those of ordinary skill in the art may easily implement the inventive concept.

Figure 1:
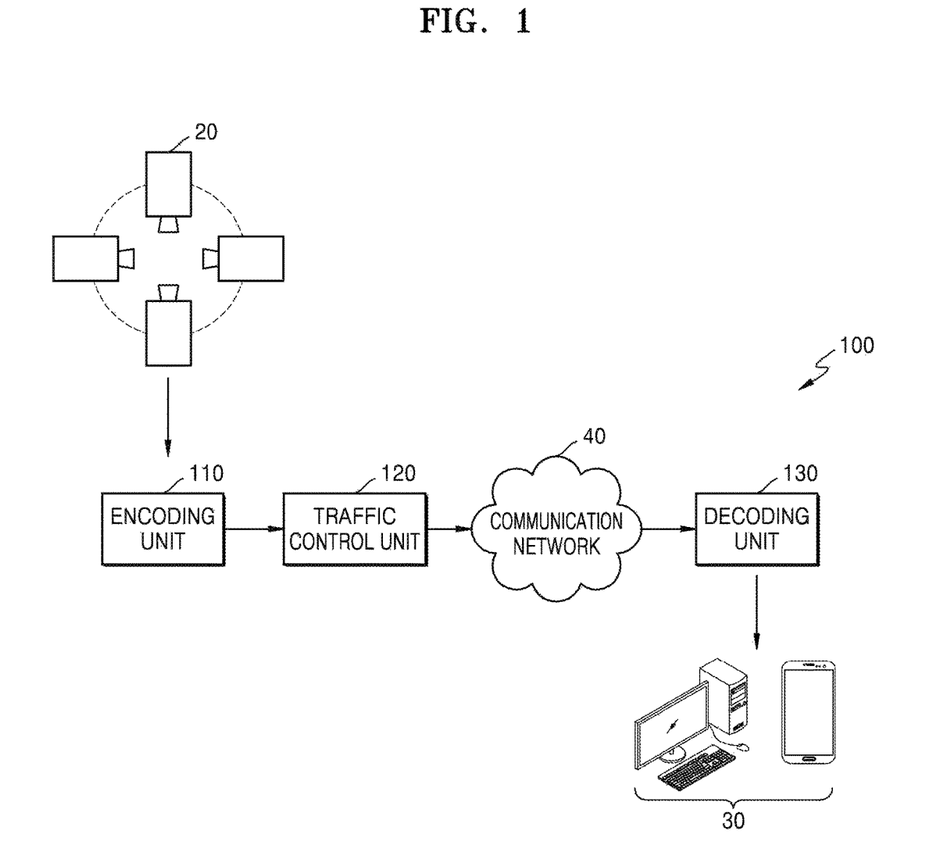
FIG. 1 is a diagram illustrating a configuration of a content streaming system according to an embodiment.

FIG. 1 is a diagram illustrating a configuration of a content streaming system according to an embodiment.

Referring to FIG. 1, a content streaming system 100 according to an embodiment includes one or more four-dimensional (4D) photographing cameras 20, an output terminal 30, a communication network 40, an encoding unit 110, a traffic control unit 120, and a decoding unit 130.

First, the camera 20 may be a camera group including a plurality of cameras for 4D content capturing. The 4D content corresponding to the addition of a time axis to a three-dimensional (3D) image representing a stereoscopic image may be referred to as a 3D moving image (video). According to an embodiment, the camera 20 may include a plurality of multiview cameras that may generate 4D content by generating a moving image by photographing a subject at a synchronization time. In particular, the camera 20 may capture a moving image to generate real person-centered content.

Next, the output terminal 30 may be a terminal capable of outputting 4D content. The output terminal 30 may output 4D content decoded by the decoding unit 130. The output terminal 30 may include any terminal such as a personal computer or a portable terminal that may output 4D content. Although FIG. 1 illustrates that the decoding unit 130 is located outside the output terminal 30, this is merely an example for conceptual description and the decoding unit 130 may be located inside the output terminal 30.

The communication network 40 may connect an encoding unit and a decoding unit to output 4D content to a plurality of output terminals 30. That is, according to an embodiment, the communication network 40 may refer to a communication network that provides an access path so that the output terminals 30 may access the content streaming system 100 to transmit/receive packet data thereto/therefrom. That is, according to an embodiment, the communication network 40 may include any communication mode such as wired communication or wireless communication, and may include various communication networks such as Local Area Network (LAN), Metropolitan Area Network (MAN), and Wide Area Network (WAN). Preferably, the communication network 40 described herein may be, for example, the Internet or World Wide Web (WWW). However, the communication network 40 is not limited thereto and may include at least partially known wired/wireless data communication networks, known telephone networks, or known wired/wireless television communication networks.

According to an embodiment, the bandwidth of the communication network 40 may be restricted to a certain value or more. In the case of 4D content, since the data amount thereof is massive in comparison with conventional video data, when the produced 4D content is intactly transmitted to the decoding unit 130 through the communication network 40, overload may occur in the communication network 40. Thus, the content streaming system 100 according to an embodiment may control the traffic in the 4D content streaming process in consideration of the communication network bandwidth and recover the data dropped in the traffic control process by motion data-based interpolation, thereby making it possible to stream the 4D content in a near-original manner while preventing communication network overload. Accordingly, the content streaming method according to an embodiment may stream the 4D content by intactly utilizing the conventional video-based infrastructure, and may increase the streaming accuracy by using not simple linear interpolation but skeleton model-based interpolation.

For this purpose, the content streaming system 100 according to an embodiment includes the encoding unit 110, the traffic control unit 120, and the decoding unit 130. The encoding unit 110 generates frame-by-frame mesh data and motion data, converts the mesh data into a geometry image, encodes the geometry image with tagged motion data, and generates first streaming data. Also, the traffic control unit 120 selects a drop frame dropping the geometry image based on the network bandwidth, drops the geometry image of the drop frame from the first streaming data, and generates second streaming data. Also, the decoding unit 130 decodes the second streaming data, converts a geometry image of the decoded second streaming data into mesh data, and interpolates and generates mesh data of the drop frame. Hereinafter, the respective configurations of the encoding unit 110, the traffic control unit 120, and the decoding unit 130 will be described in more detail.

Figure 2:
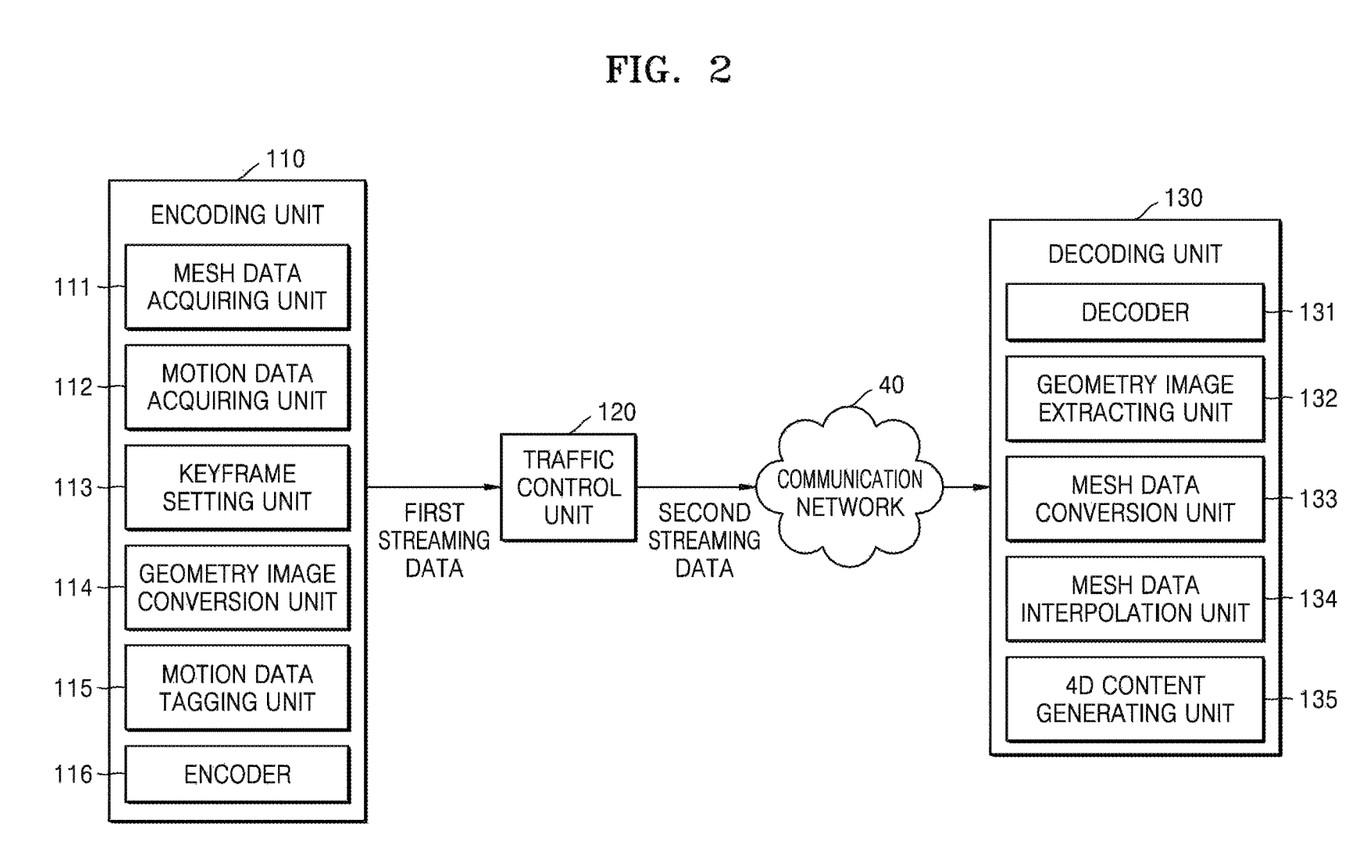
FIG. 2 is a block diagram of a content streaming system according to an embodiment.

FIG. 2 is a block diagram of a content streaming system according to an embodiment.

Referring to FIG. 2, the encoding unit 110 according to an embodiment includes a mesh data acquiring unit 111, a motion data acquiring unit 112, a keyframe setting unit 113, a geometry image conversion unit 114, a motion data tagging unit 115, and an encoder 116.

Also, the decoding unit 130 includes a decoder 131, a geometry image extracting unit 132, a mesh data conversion unit 133, and a mesh data interpolation unit 134.

First, the mesh data acquiring unit 111 of the encoding unit 110 acquires frame-by-frame mesh data. The frame-by-frame mesh data may be stereoscopic mesh data that is generated based on frame-by-frame images generated by cameras.

Next, the motion data acquiring unit 112 acquires the motion data corresponding to the frame-by-frame mesh data. Like the mesh data, the motion data may be motion data that is generated based on frame-by-frame images generated by cameras, and may be data representing motion in a stereoscopic image. As an example, the motion data may represent a data change value of the previous frame adjacent to the current frame.

Next, the keyframe setting unit 113 sets a frame corresponding to big-motion motion data among the motion data as a keyframe. In this case, the big-motion motion data to be set for the keyframe may be determined not by an absolute value but by a relative value. That is, since the frame having big-motion motion data in comparison with other frames is set as the keyframe, by not dropping the big-motion motion data in the process of controlling the traffic by the traffic control unit 120 described later, the original 4D data may be preserved as much as possible.

Next, the geometry image conversion unit 114 converts the mesh data into the geometry image. The geometry image conversion unit 114 may convert the mesh data into the geometry image by using known technology. According to an embodiment, since the mesh data is converted into the geometry image prior to transmission, 4D data may be transmitted more easily.

Next, the motion data tagging unit 115 tags the motion data to the geometry image. The motion data tagging unit 115 may tag motion data to geometry images with respect to each frame-by-frame geometry image. Thus, when generating the streaming data, the inventive concept may simultaneously transmit not only the geometry image based on the mesh data but also the motion data corresponding to each frame.

Next, the encoder 116 encodes the geometry image with tagged motion data and generates the first streaming data.

Next, the traffic control unit 120 selects a drop frame dropping the geometry image based on the network bandwidth, drops the geometry image of the drop frame from the first streaming data, and generates second streaming data. In this case, "dropping the geometry image" refers to "deleting the corresponding geometry image from the first streaming data". When considering the network bandwidth, since the geometry image converted from the mesh data is large in size, the network overload may be caused in the case of transmitting all the geometry images of all frames. Thus, according to an embodiment, the traffic control unit 120 may reduce the traffic by generating the second streaming data by dropping the geometry images of some frames from the first streaming data. In this case, the traffic control unit 120 maintains the motion data of the drop frame. Since the motion data is relatively small in size, even when the motion data is maintained for all frames, it is unlikely to cause overload in the network. Thus, the traffic control unit 120 maintains the motion data of all frames regardless of the drop frame.

Also, the traffic control unit 120 may select the drop frame in consideration of the bandwidth of the communication network 40. When the communication network 40 has a large bandwidth, the traffic control unit 120 may select no drop frames or only some drop frames. When the communication network 40 has a small bandwidth, the traffic control unit 120 may select many drop frames.

Also, the traffic control unit 120 may select the drop frame except the keyframe. As described above, since the keyframe has big-motion motion data in comparison with other frames, preserving the original geometry image data in the case of the keyframe may help to accurately stream the 4D content. Thus, the traffic control unit 120 may not select the keyframe as the drop frame. Alternatively, the traffic control unit 120 may select a frame adjacent to the keyframe as the drop frame.

Next, upon receiving the second streaming data, the decoder 131 of the decoding unit 130 decodes the second streaming data.

Also, the geometry image extracting unit 132 extracts a geometry image from the decoded data. In this case, the extracted geometry images may be the geometry images of the other frames except the drop frame. However, since the motion data is not dropped even from the drop frame, the motion data may be extracted from all the frames.

Also, the mesh data conversion unit 133 converts the extracted geometry image into mesh data. As described above, since the geometry images are not extracted from the drop frame, the mesh data is not generated in the drop frame.

Also, the mesh data interpolation unit 134 interpolates and generates mesh data that is not generated in the drop frame. In more detail, the mesh data interpolation unit 134 interpolates and generates mesh data corresponding to the drop frame based on motion data of the drop frame and mesh data of a frame adjacent to the drop frame. Although the mesh data is not generated in the drop frame, since the motion data is still maintained, the mesh data may be interpolated and generated by using the mesh data of the frames adjacent to the motion data. Also, the mesh data interpolation unit 134 may interpolate and generate the mesh data of the drop frame by a blend shape technique.

In this manner, according to an embodiment, since the dropped mesh data may be generated not by simple linear interpolation but by motion data-based interpolation by using a mesh data interpolation method, the 4D content may be streamed in a near-original manner.

Also, a 4D content generating unit 135 generates 4D content by using the mesh data acquired from the geometry image and the mesh data generated by interpolation and provides the 4D content to the output terminal 30 so that the 4D content may be output by the output terminal 30.

Figure 3:
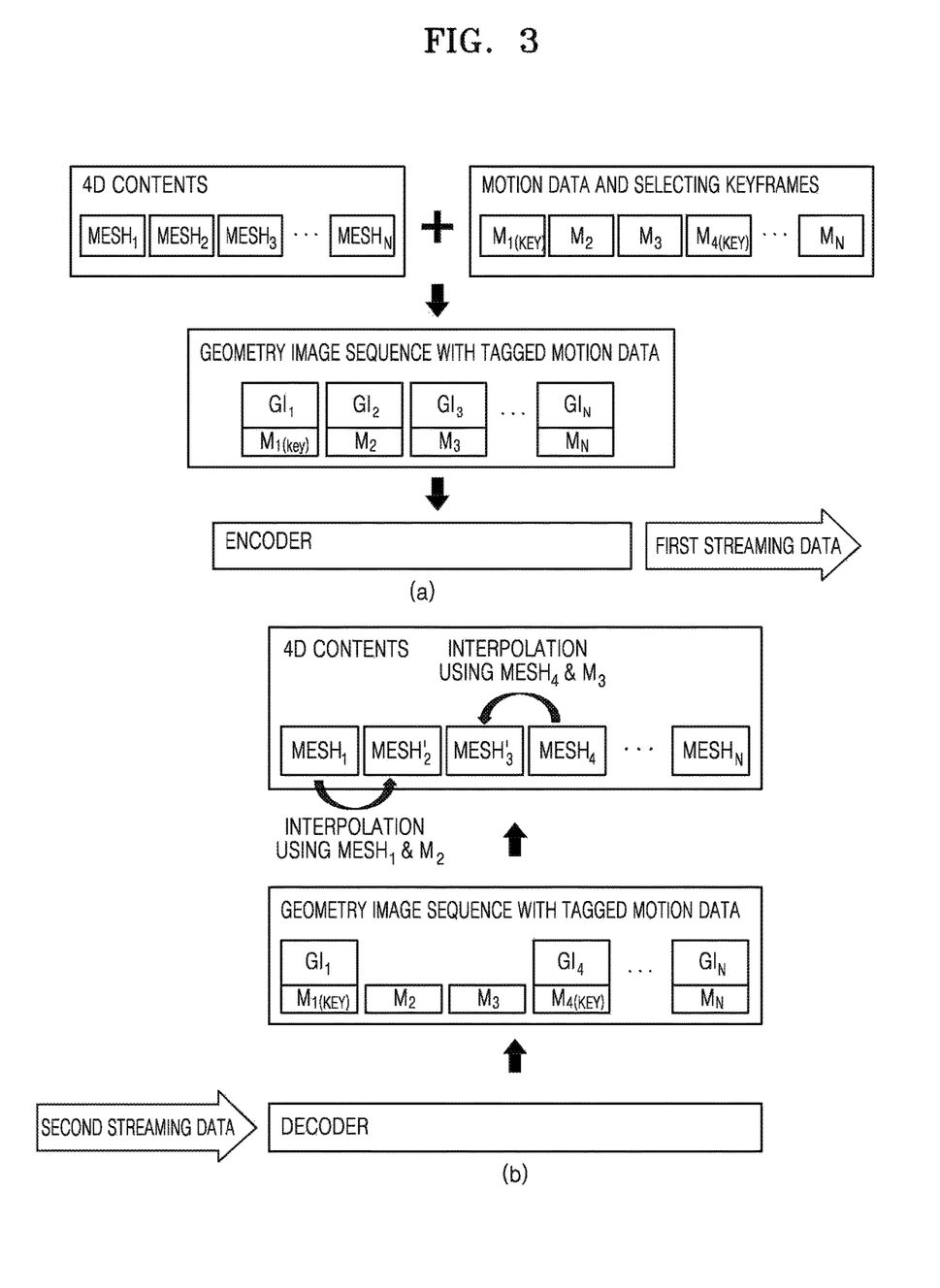
FIG. 3 is a diagram illustrating a streaming process of a content streaming system according to an embodiment.

FIG. 3 is a diagram illustrating a streaming process of a content streaming system according to an embodiment.

First, referring to FIG. 3(a), mesh data $Mesh_1$, $Mesh_2$, $Mesh_3$, . . . , $Mesh_N$ corresponding respectively to Frame1, Frame2, Frame3, . . . , FrameN may be generated as 4D content. Also, $M_1$, $M_2$, $M_3$, $M_4$, . . . , $M_N$ corresponding respectively to Frame1, Frame2, Frame3, Frame4, . . . , FrameN may be generated as motion data. In this case, according to an embodiment, a frame corresponding to big-motion motion data among the motion data may be selected as a keyframe, and Frame1 and Frame 4 respectively corresponding to the motion data $M_1$ and $M_4$ may be selected as a keyframe, as illustrated in FIG. 3. The motion data corresponding to the keyframe is expressed as $M_{1(key)}$ and $M_{4(key)}$, respectively.

Next, geometry images $GI_1$, $GI_2$, $GI_3$, . . . , $GI_N$ may be converted and generated respectively from the mesh data $Mesh_1$, $Mesh_2$, $Mesh_3$, . . . , $Mesh_N$. In this case, the geometry images $GI_1$, $GI_2$, $GI_3$, . . . , $GI_N$ are tagged respectively with the motion data $M_{1(key)}$, $M_2$, $M_3$, . . . , $M_N$ (Geometry Image Sequence with tagged information). Next, the encoder 116 encodes the geometry image with tagged motion data and generates the first streaming data.

Next, referring to FIG. 3(b), the second streaming data dropping some geometry images may be decoded by the decoder. In this case, according to an embodiment of FIG. 3, it is assumed that Frame2 and Frame3 are selected as drop frames and thus the geometry images $GI_2$ and $GI_3$ respectively corresponding to the Frame2 and Frame3 are not included in the second streaming data. Since Frame1 and Frame4 are keyframes, the geometry image may not be dropped from the second streaming data.

That is, as may be seen from the geometry images with tagged motion data (Geometry Image Sequence with tagged motion data) after the decoding of the second streaming data of FIG. 3, the motion data $M_{1(key)}$, $M_2$, $M_3$, $M_{4(key)}$, . . . , $M_N$ are present in all the frames, but the geometry images $GI_1$, $GI_4$, . . . , $GI_N$ are not present in the drop frames. Thus, since the mesh data of all the frames may not be obtained just by converting the geometry images, the mesh data is interpolated and generated with respect to the drop frame. According to the embodiment of FIG. 3, the mesh data $Mesh_2'$ of the drop frame "Frame2" is generated by interpolation in the mesh data $Mesh_1$ of an adjacent frame by using the motion data $M_2$ of the corresponding frame. Also, the mesh data $Mesh_3'$ of the drop frame "Frame3" is generated by interpolation in the mesh data $Mesh_4$ of an adjacent frame by using the motion data $M_3$ of the corresponding frame. As in the embodiment of FIG. 3, the mesh data of the drop frame may be generated by interpolation, and the 4D content of the entire frame may be acquired accordingly.

Figure 4:
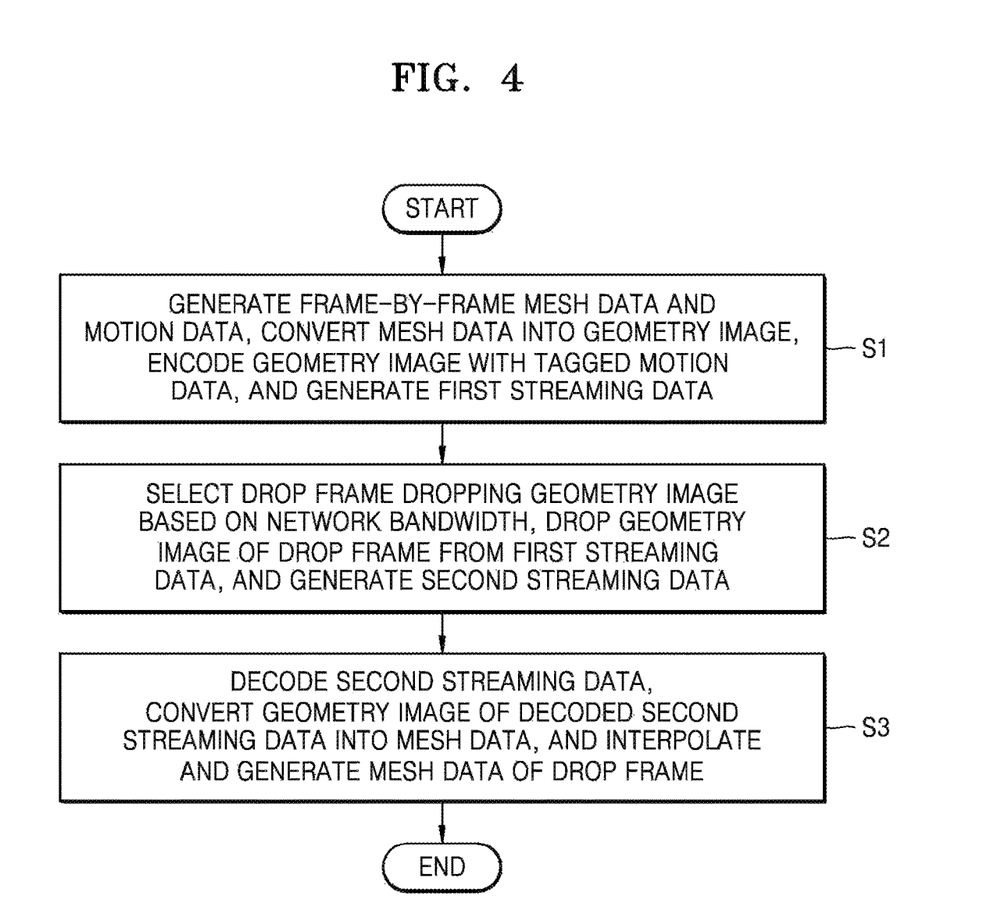
FIG. 4 is a diagram illustrating a sequential order of a content streaming method according to an embodiment.

FIG. 4 is a diagram illustrating a sequential order of a content streaming method according to an embodiment.

Referring to FIG. 4, the content streaming system generates frame-by-frame mesh data and motion data, converts the mesh data into a geometry image, encodes the geometry image with tagged motion data, and generates first streaming data (S1).

Next, the content streaming system selects a drop frame dropping the geometry image based on the network bandwidth, drops the geometry image of the drop frame from the first streaming data, and generates second streaming data (S2).

Finally, the content streaming system decodes the second streaming data, converts a geometry image of the decoded second streaming data into mesh data, and interpolates and generates mesh data of the drop frame (S3) to provide 4D content.

Figure 5:
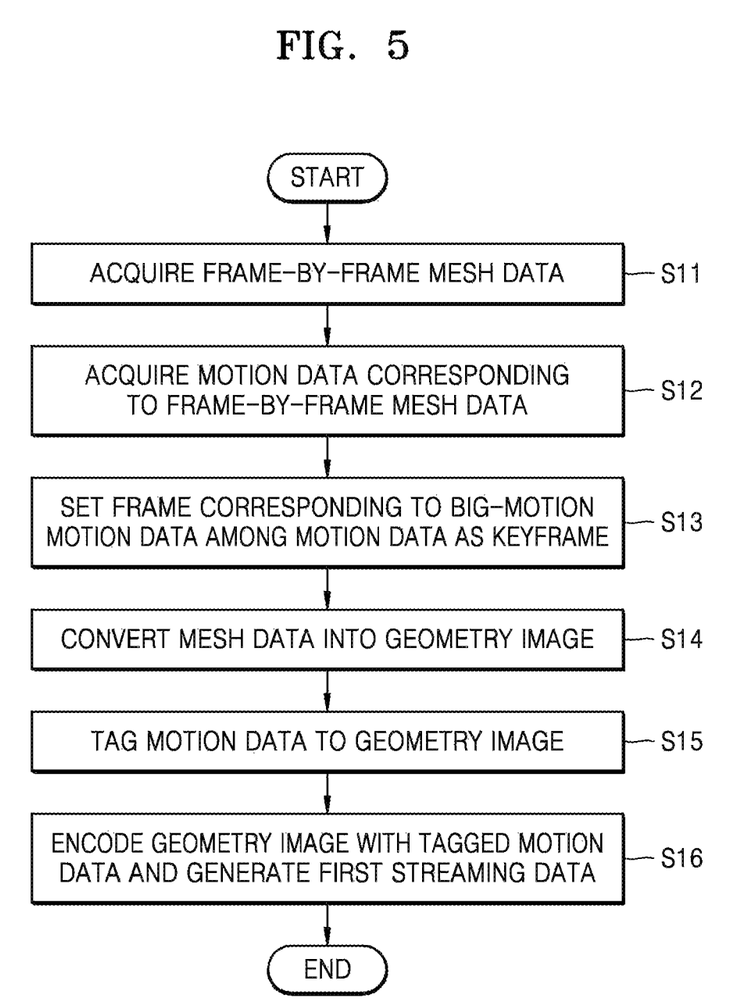
FIG. 5 is a diagram illustrating a sequential order of one operation of a content streaming method according to an embodiment.

FIG. 5 is a diagram illustrating a sequential order of one operation of a content streaming method according to an embodiment.

FIG. 5 illustrates an embodiment of operation S1 of FIG. 4. The operations of FIG. 5 may be performed by the encoding unit 110 of the content streaming system. In more detail, the content streaming system acquires frame-by-frame mesh data (S11).

Next, the content streaming system acquires motion data corresponding to the frame-by-frame mesh data (S12).

Next, the content streaming system sets a frame corresponding to big-motion motion data among the motion data as a keyframe (S13).

Next, the content streaming system converts the mesh data into a geometry image (S14).

Next, the content streaming system tags the motion data to the geometry image (S15).

Finally, the content streaming system encodes the geometry image with tagged motion data and generates the first streaming data (S16).

Figure 6:
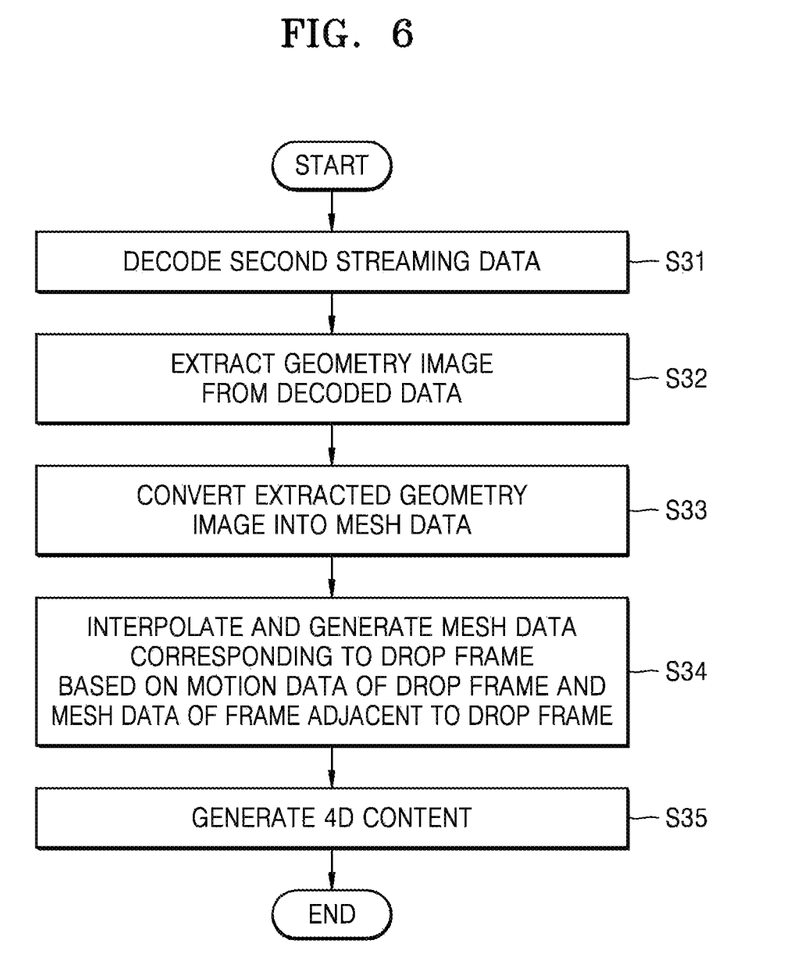
FIG. 6 is a diagram illustrating a sequential order of one operation of a content streaming method according to an embodiment.

FIG. 6 is a diagram illustrating a sequential order of one operation of a content streaming method according to an embodiment.

FIG. 6 illustrates an embodiment of operation S3 of FIG. 4. The operations of FIG. 6 may be performed by the decoding unit 130 of the content streaming system. In more detail, the content streaming system decodes the second streaming data (S31).

Next, the content streaming system extracts a geometry image from the decoded data (S32).

Next, the content streaming system converts the extracted geometry image into mesh data (S33).

Next, the content streaming system interpolates and generates mesh data corresponding to the drop frame based on motion data of the drop frame and mesh data of a frame adjacent to the drop frame (S34).

Finally, the content streaming system generates the 4D content (S35).

Particular implementations described herein are merely embodiments, and do not limit the scope of the inventive concept in any way. For the sake of conciseness, descriptions of related art electronic configurations, control systems, software, and other functional aspects of the systems may be omitted. Also, the connection lines or connection members between various elements illustrated in the drawings represent examples of functional connections and/or physical or logical connections between the various elements, and various alternative or additional functional connections, physical connections, or logical connections may be present in practical apparatuses. Also, no element may be essential to the practice of the inventive concept unless the element is specifically described as "essential" or "critical".

The use of the terms "a", "an", and "the" and similar referents in the context of the specification (especially in the context of the following claims) may be construed to cover both the singular and the plural. Also, recitation of a range of values herein are merely intended to serve as a shorthand method of referring individually to each separate value falling within the range, unless otherwise indicated herein, and each separate value is incorporated into the specification as if it was individually recited herein. Also, the operations of the method described herein may be performed in any suitable order unless otherwise indicated herein or otherwise clearly contradicted by the context. The scope of the inventive concept is not limited to the above-described operation order. All examples or exemplary terms (e.g., "such as") provided herein are merely used to describe the inventive concept in detail, and the scope of the inventive concept is not limited by the examples or exemplary terms unless otherwise claimed. Also, those of ordinary skill in the art will readily understand that various modifications and combinations may be made according to design conditions and factors without departing from the spirit and scope of the inventive concept as defined by the following claims.

The above embodiments of the inventive concept may be embodied in the form of program commands executable through various computer components, which may be recorded on a computer-readable recording medium. The computer-readable recording medium may include program commands, data files, and data structures either alone or in combination. The program commands recorded on the computer-readable recording medium may be those that are especially designed and configured for the inventive concept, or may be those that are known and available to computer programmers skilled in the art. Examples of the computer-readable recording medium may include magnetic recording mediums such as hard disks, floppy disks, and magnetic tapes, optical recording mediums such as CD-ROMs and DVDs, magneto-optical recording mediums such as floptical disks, and hardware devices such as ROMs, RAMs and flash memories that are especially configured to store and execute program commands. Examples of the program commands may include machine language codes that may be generated by a compiler, and high-level language codes that may be executed by a computer by using an interpreter. The hardware device may be modified into one or more software modules to perform a process according to the inventive concept, and vice versa.

According to the inventive concept, the 4D content capable of expressing 3D motion of a real person may be streamed by using the conventional video-based infrastructure.

Also, according to the inventive concept, the accuracy of stream data in the 4D data streaming process may be increased by using motion data-based interpolation.

Although the inventive concept has been described above by the drawings, certain embodiments, and particular features such as specific components, this is merely provided to promote a more comprehensive understanding of the inventive concept, the inventive concept is not limited to the above embodiments, and those of ordinary skill in the art may made various modifications therein.

Thus, the spirit of the inventive concept is not limited to the above embodiments, and the scope of the inventive concept may include both the following claims and the equivalents thereof.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the inventive concept as defined by the following claims.

What is claimed is:

1. A content streaming system comprising:
    an encoding computer component generating frame-by-frame mesh data and motion data, converting the mesh data into a plurality of geometry images including a first plurality of geometry images and a second plurality of geometry images, encoding the plurality of geometry images with tagged motion data, and generating first streaming data including the plurality of geometry images and the tagged motion data;
    a traffic controller selecting a plurality of drop frames of the first plurality of geometry images based on a network bandwidth, dropping the selected first plurality of geometry images of the plurality of drop frames from the first streaming data, and generating second streaming data including the second plurality of geometry images and the tagged motion data; and
    a decoding computer component decoding the second streaming data, converting the second plurality of geometry images of the decoded second streaming data into the mesh data, and interpolating and generating the mesh data of the plurality of drop frames.

2. The content streaming system of claim 1, wherein the motion data tagged to the first plurality of dropped geometry image is not dropped from the plurality of drop frames.

3. The content streaming system of claim 1, wherein the decoding computer component interpolates and generates the mesh data of the plurality of drop frames based on motion data of the plurality of drop frames and mesh data of a frame adjacent to one of the plurality of drop frames.

4. The content streaming system of claim 1, wherein the second plurality of geometry images includes an image of a keyframe corresponding to biggest-motion motion data among the motion data.

5. The content streaming system of claim 4, wherein one of the plurality of drop frames is a frame adjacent to the keyframe.

6. The content streaming system of claim 1, wherein the encoding computer component comprises:
    a mesh data acquiring component acquiring the frame-by-frame mesh data;
    a motion data acquiring component acquiring the motion data corresponding to the frame-by-frame mesh data;
    a keyframe setting component setting a frame corresponding to biggest-motion motion data among the motion data as a keyframe;
    a geometry image conversion component converting the mesh data into the plurality of geometry images;
    a motion data tagging component tagging the motion data to the plurality of geometry images; and
    an encoder encoding the plurality of geometry images with the tagged motion data and generating the first streaming data.

7. The content streaming system of claim 1, wherein the decoding component comprises:
    a decoder decoding the second streaming data;
    a geometry image extracting component extracting the second plurality of images from the decoded data;

a mesh data conversion component converting the extracted second plurality of geometry images into the mesh data; and a mesh data interpolation component interpolating and generating the mesh data corresponding to the plurality of drop frames based on the motion data of the plurality of drop frames and mesh data of a frame adjacent to one of the plurality of drop frames.

8. The content streaming system of claim 7, wherein the mesh data interpolation component interpolates and generates the mesh data of the plurality of drop frames by a blend shape technique by using the motion data corresponding to the mesh data of the adjacent frame.

9. A content streaming method comprising:

an encoding operation of generating frame-by-frame mesh data and motion data, converting the mesh data into a plurality of geometry images including a first plurality of geometry images and a second plurality of geometry images, encoding the plurality of geometry image with tagged motion data, and generating first streaming data including the plurality of geometry images and the tagged motion data;

a traffic control operation of selecting a plurality of drop frames of the first plurality of geometry images based on a network bandwidth, dropping the selected first plurality of geometry images of the plurality of drop frames from the first streaming data, and generating second streaming data including the second plurality of geometry images and the tagged motion data; and a decoding operation of decoding the second streaming data, converting the second plurality of geometry images of the decoded second streaming data into the mesh data, and interpolating and generating the mesh data of the plurality of drop frames.

10. The content streaming method of claim 9, wherein the motion data tagged to the first plurality of dropped geometry image is not dropped from the plurality of drop frames.

11. The content streaming method of claim 9, wherein the decoding operation comprises interpolating and generating the mesh data of the plurality of drop frames based on motion data of the plurality of drop frames and mesh data of a frame adjacent to one of the plurality of drop frames.

12. The content streaming method of claim 9, wherein the second plurality of geometry images includes an image of a keyframe corresponding to biggest-motion motion data among the motion data.

13. The content streaming method of claim 12, wherein one of the plurality of drop frames is a frame adjacent to the keyframe.

14. The content streaming method of claim 9, wherein the encoding operation comprises:

a mesh data acquiring operation of acquiring the frame-by-frame mesh data;

a motion data acquiring operation of acquiring the motion data corresponding to the frame-by-frame mesh data;

a keyframe setting operation of setting a frame corresponding to biggest-motion motion data among the motion data as a keyframe;

a geometry image conversion operation of converting the mesh data into the plurality of geometry images; and a motion data tagging operation of tagging the motion data to the plurality of geometry images.

15. The content streaming method of claim 9, wherein the decoding operation comprises:

a geometry image extracting operation of extracting the second plurality of images from the decoded second streaming data;

a mesh data conversion operation of converting the extracted second plurality of geometry images into the mesh data; and a mesh data interpolation operation of interpolating and generating the mesh data corresponding to the plurality of drop frames based on the motion data of the plurality of drop frames and mesh data of a frame adjacent to one of the plurality of drop frames.

16. The content streaming method of claim 15, wherein the mesh data interpolation operation comprises interpolating and generating the mesh data of the plurality of drop frames by a blend shape technique by using the motion data corresponding to the mesh data of the adjacent frame.

* * * * *